(12) United States Patent
Tang

(10) Patent No.: US 11,350,438 B2
(45) Date of Patent: May 31, 2022

(54) METHOD FOR CONFIGURING SCHEDULING REQUEST, TERMINAL DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 125 days.

(21) Appl. No.: 16/646,838

(22) PCT Filed: Sep. 15, 2017

(86) PCT No.: PCT/CN2017/101881
§ 371 (c)(1),
(2) Date: Mar. 12, 2020

(87) PCT Pub. No.: WO2019/051770
PCT Pub. Date: Mar. 21, 2019

(65) Prior Publication Data
US 2020/0275468 A1    Aug. 27, 2020

(51) Int. Cl.
*H04W 72/12* (2009.01)
*H04W 72/04* (2009.01)
*H04W 74/08* (2009.01)

(52) U.S. Cl.
CPC ... *H04W 72/1284* (2013.01); *H04W 72/0413* (2013.01); *H04W 72/1263* (2013.01); *H04W 74/0833* (2013.01)

(58) Field of Classification Search
None
See application file for complete search history.

(56) References Cited

U.S. PATENT DOCUMENTS

2012/0176967 A1   7/2012   Kim
2013/0279343 A1   10/2013  Jeong
(Continued)

FOREIGN PATENT DOCUMENTS

CN    102474880 A    5/2012
CN    103299699 A    9/2013
(Continued)

OTHER PUBLICATIONS

R2-1707736 3GPP TSG RAN WG2 #99 Aug. 2017 Oppo "Details of SR procedure" (Year: 2017).*
(Continued)

*Primary Examiner* — Jeffrey M Rutkowski
*Assistant Examiner* — Basil Ma
(74) *Attorney, Agent, or Firm* — Ladas & Parry LLP

(57) ABSTRACT

Disclosed are a method for configuring a scheduling request, a terminal device, and a computer storage medium. The method comprises: configuring a scheduling request transmission prohibiting timer, wherein the scheduling request transmission prohibiting tinier is used for prohibiting transmission of scheduling requests on configuration parameters of all the scheduling requests mapped by a logical channel within an effective period; configuring a scheduling request counter, wherein the scheduling request counter is used for increasing, when the scheduling requests are transmitted in the configuration parameters of at least one scheduling request mapped by the logical channel, all count valves thereof.

17 Claims, 2 Drawing Sheets

(56) References Cited

U.S. PATENT DOCUMENTS

| | | | |
|---|---|---|---|
| 2014/0307670 A1 | 10/2014 | Kim et al. | |
| 2015/0173047 A1 | 6/2015 | Yamada | |
| 2015/0173120 A1 | 6/2015 | Yamada | |
| 2016/0044678 A1 | 2/2016 | Kwon | |
| 2016/0150423 A1 | 5/2016 | Jeong et al. | |
| 2016/0242171 A1 | 8/2016 | Kim et al. | |
| 2016/0270110 A1* | 9/2016 | Dinan | H04L 5/0053 |
| 2016/0270114 A1 | 9/2016 | Dinan | |
| 2017/0064734 A1 | 3/2017 | Tsuboi et al. | |
| 2017/0078984 A1 | 3/2017 | Uemura et al. | |
| 2017/0164249 A1 | 6/2017 | Uemura et al. | |
| 2017/0223757 A1 | 8/2017 | Tsuboi et al. | |
| 2017/0280339 A1 | 9/2017 | Jeong et al. | |
| 2017/0285105 A1 | 10/2017 | Uemura et al. | |
| 2018/0027565 A1 | 1/2018 | Kwon | |
| 2018/0049188 A1 | 2/2018 | Kim et al. | |
| 2018/0049231 A1* | 2/2018 | Yamada | H04W 72/1284 |
| 2018/0167966 A1 | 6/2018 | Dinan | |
| 2018/0359766 A1* | 12/2018 | Shih | H04W 72/12 |
| 2019/0246417 A1 | 8/2019 | Dinan | |
| 2020/0245345 A1* | 7/2020 | Turtinen | H04W 72/1242 |

FOREIGN PATENT DOCUMENTS

| | | |
|---|---|---|
| CN | 104170508 A | 11/2014 |
| CN | 105814942 A | 7/2016 |
| CN | 105814957 A | 7/2016 |
| CN | 105934994 A | 9/2016 |
| CN | 106105301 A | 11/2016 |
| CN | 106538008 A | 3/2017 |
| CN | 106576079 A | 4/2017 |
| CN | 106576378 A | 4/2017 |
| CN | 106664595 A | 5/2017 |
| CN | 106664647 A | 5/2017 |
| CN | 106797676 A | 5/2017 |
| CN | 107409412 A | 11/2017 |
| EP | 3169108 A1 | 5/2017 |
| EP | 3179766 A1 | 6/2017 |
| WO | 2016144893 A1 | 9/2016 |
| WO | 2016157798 A1 | 10/2016 |

OTHER PUBLICATIONS

R2-1707915 3GPP TSG-RAN WG2 #99 Aug. 2017 CATT "Discussion on SR" (Year: 2017).*

R2-1709450 3GPP TSG-RAN WG2 #99 Jun. 2017 Samsung UK "SR Timers" (Year: 2017).*

R2-1708496 3GPP TSG-RAN WG2 #99 Aug. 2017 Vivo "Discussion on mapping between SR configuration and LCH" (Year: 2017).*

R2-1709450 Samsung "SR timers" 3GPP WG2 #99 Berlin Jun. 27-29, 2017 (Year: 2017).*

3GPP TSG-RAN WG2 Meeting #99 R2-1707915, Berlin, Germany, Aug. 21-25, 2017, Source: CATT, Title: Discussion on SR, Agenda Item: 10.3.1.5, Document for: Discussion and Decision.

3GPP TSG-RAN WG2 Meeting #89 R2-150129, Athens, Greece, Feb. 9-13, 2015, Agenda item: 7.2, Source: Nokia Networks, Nokia Corporation, Title: SR on SCell, WID/SID: LTE_CA_enh_b5C-Core / Release 13, Document for Discussion and Decision.

First Office Action of the Japanese application No. 2020-515245, dated Jul. 20, 2021.

First Office Action of the Indian application No. 202017015841, dated May 22, 2021.

HTC, Discussion on LCG and SR configuration, 3GPP TSG-RAN WG2 #99 R2-1709420 Bertin, Germany, Aug. 21-25, 2017.

English translation of the Written Opinin of the International Search Authority in the international application No. PCT/CN2017/101881, dated May 22, 2018.

International Search Report in the international application No. PCT/CN2017/101881, dated May 22, 2018.

Ericsson: "SR failure handling", 3GPP Draft; R2-1708197—SR Failure Handling, 3rd Generation Partnership Project (3GPP), Mobile Competence Centre; 650, Route Des Lucioles; F-06921 Sophia-Antipolis Ced Ex; France, vol. RAN WG2, No. Berlin, Germany; Aug. 21, 2017-Aug. 25, 2017; Aug. 20, 2017 (Aug. 20, 2017), XP051318100, * section 1 *.

Supplementary International Search Report in the international application No. PCT/CN2017/101881, dated Dec. 3, 2019.

First Office Action of the Taiwanese application No. 107132551, dated Oct. 29, 2021.

HTC, R2-1706957, discussion on details of SR procedures. 3GPP TSG RAN WG2 #AHS, 3GPP server publication date (Jun. 17, 2017).

Huawei et al, R2-1705198, SR triggering and cancellation, 3GPP TSG RAN WG2 #98, 3GPP server publication date (May 6, 2017).

First Office Action of the Korean application No. 10-2020-7009986, dated Jan. 18, 2022.

Second Office Action of the European application No. 17925336.4, dated Mar. 16, 2022.

* cited by examiner

METHOD FOR CONFIGURING SCHEDULING REQUEST, TERMINAL DEVICE, AND COMPUTER STORAGE MEDIUM

RELATED APPLICATION

This application is an application under 35 U.S.C. 371 of International Application No. PCT/CN2017/101881 filed on Sep. 15, 2017, the entire contents of which are incorporated herein by reference.

TECHNICAL FIELD

The disclosure relates to the technical field of information processing, and particularly to a method for configuring a scheduling request, a terminal device and a computer storage medium.

BACKGROUND

A Long Term Evolution (LTE) scheduling request (SR) is a message of 1 bit, which is transmitted by a terminal on a physical uplink control channel (PUCCH) for requesting uplink authorized resources. The scheduling request is triggered under a condition as follows. The terminal triggers reporting of a regular buffer status report (BSR), and the terminal has available PUCCH resources in a current transmission slot and an SR prohibit transmission timer (sr-ProhibitTimer) does not run. It is to be noted that a media access control (MAC) layer has only one sr-ProhibitTimer in the LTE.

In the LTE, a MAC entity corresponding to a terminal may perform one or more SR configurations. Many SR configurations are performed in carrier aggregation (CA), and a secondary cell (SCell) has SR configuration corresponding to the secondary cell. In combination with SR configurations, a mapping between different SR configurations and a logical channel of a terminal is configured by a network, the different SR configurations correspond to different aggregated carriers, and there is a to-be-solved problem of how to select a PUCCH for transmission, and how the timer runs if the logic channel is mapped to SR configurations of multiple different carriers.

SUMMARY

In order for solving the foregoing technical problems, a method for configuring a scheduling request, a terminal device and a computer storage medium are provided according to the embodiments of the disclosure.

A method for configuring a scheduling request is provided according to an embodiment of the disclosure, which is applied to a terminal device, and includes the following operations.

A scheduling request prohibit transmission timer is configured. The scheduling request prohibit transmission timer is configured to prohibit transmitting a scheduling request on all scheduling request configurations mapped to a logical channel for a valid duration.

A scheduling request counter is configured. The scheduling request counter is configured to, when a scheduling request is transmitted on at least one scheduling request configuration mapped to the logical channel, increase a count value.

A terminal device is provided according to an embodiment of the disclosure, which includes a timer configuration unit and a counter configuration unit.

The timer configuration unit is configured to configure a scheduling request prohibit transmission timer. The scheduling request prohibit transmission timer is configured to prohibit transmitting a scheduling request on all scheduling request configurations mapped to a logical channel for a valid duration.

The counter configuration unit is configured to configure a scheduling request counter. The scheduling request counter is configured to, when a scheduling request is transmitted on at least one scheduling request configuration mapped to the logical channel, increase a count value.

A terminal device is provided according to an embodiment of the disclosure, which includes a processor and a memory configured to store a computer program capable of being run in the processor.

Herein, the processor is configured to execute the steps of the abovementioned method when running the computer program.

A computer storage medium is provided according to an embodiment of the disclosure, in which a computer-executable instruction is stored. The computer-executable instruction implements the steps of the abovementioned method when being executed.

With the technical solutions of the embodiments of the disclosure, the scheduling request prohibit transmission timer may be configured, resources corresponding to all the scheduling request configurations mapped to the logical channel may be prohibited from transmitting a scheduling request through the timer, and the scheduling request counter is configured to record the transmission number of transmitting the scheduling request on the resources corresponding to all the scheduling request configurations mapped to the logical channel. In this way, a transmission interval and the transmission number of the scheduling requests can be controlled in a multi-carrier scenario, thereby avoiding more processing resources from being used for transmission and other operations during the transmission of the scheduling request, and further ensuring system processing efficiency.

DETAILED DESCRIPTION

In order to make characteristics and technical contents of the embodiments of the disclosure be understood in more detail, implementation of the embodiments of the disclosure is described in detail below in combination with the drawings. The drawings are only used as a reference for description, and not intended to limit the embodiments of the disclosure.

First Embodiment

Figure 1:
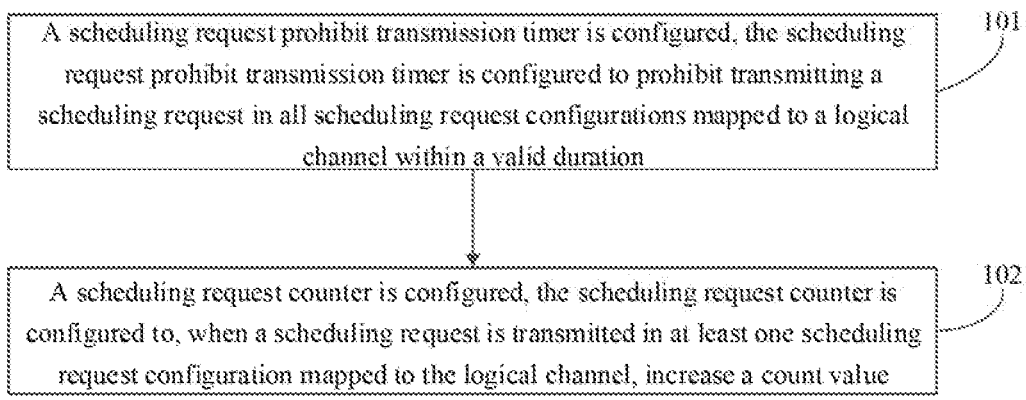
FIG. 1 is a first flowchart of a method for configuring a scheduling request according to an embodiment of the disclosure.

A method for configuring a scheduling request is provided according to the embodiment of the application. The method for configuring the scheduling request is applied to a terminal device, and, as shown in FIG. 1, includes the steps 101 to 102.

In step 101, a scheduling request prohibit transmission timer is configured. The scheduling request prohibit transmission timer is configured to prohibit transmitting a scheduling request on all scheduling requests configurations mapped to a logical channel for a valid duration.

In step 102, a scheduling request counter is configured. The scheduling request counter is configured to, when a scheduling request is transmitted on at least one scheduling request configuration mapped to the logical channel, increase a count value.

Herein, the terminal device may be a terminal device applicable to a multi-carrier (CA) scenario.

It should be noted that the order for executing step 101 and step 102 may be not limited. Step 101 and step 102 may be executed simultaneously. Alternatively, step 102 may also be executed after step 101. Alternatively, step 101 may also be executed after step 102.

In a case that the logical channel is mapped to multiple scheduling request configurations, a scheduling request prohibit transmission timer may be maintained in each of the scheduling request configurations. The scheduling request prohibit transmission timer to be started is determined according to a resource corresponding to the scheduling request configuration selected for transmitting a scheduling request. For example, in a case that a resource corresponding to one of the scheduling request configurations is selected for transmission of a scheduling request, the scheduling request prohibit transmission timer in the scheduling request configuration is started. Furthermore, by starting the scheduling request prohibit transmission timer, all resources corresponding to all the scheduling request configurations mapped to the logical channel are prohibited from transmitting the SR.

In addition, the following operation may further be executed in the embodiment of the application.

A mapping relationship, configured by a network side, between the logical channel and at least one scheduling request configuration is acquired. Different scheduling request configurations in the at least one scheduling request configuration correspond to different carriers respectively. Different scheduling request configurations have the same physical uplink control channel resource period and different physical uplink control channel frequency-domain resources.

For example, if a logical channel is mapped to two scheduling request configurations (SR configuration), which are represented as SR-CONFIG-1 and SR-CONFIG-2 respectively.

Specifically, a logical channel group (LCG) is configured for a logical channel LCH a by radio resource control (RRC), and a mapping relationship between the logical channel LCH a and SR configurations is configured by the RRC. The LCH a is mapped to SR-CONFIG-1 and SR-CONFIG-2. SR-CONFIG-1 and SR-CONFIG-2 are SR configurations on a carrier 1 and a carrier 2 respectively.

Herein, SR-CONFIG-1 and SR-CONFIG-2 may have the same PUCCH resource period and different PUCCH frequency-domain resources.

SR-CONFIG-1 includes dsr-TransMax for identifying the maximum SR transmission number corresponding to the SR configuration. In addition, SR-CONFIG-1 corresponds to an sr-ProhibitTimer for identifying a prohibit time for retransmission of an SR after the SR corresponding to the SR configuration is transmitted (that is, when the sr-ProhibitTimer runs, the SR is prohibited). The SR-CONFIG-2 is configured in the same manner.

Based on a configuration condition provided in above step 101 and step 102, detailed description is made below in combination with an application scenario of the timer and the counter.

When the logical channel triggers reporting of a scheduling request and if the logical channel is mapped to at least one scheduling request configuration of at least one carrier, a scheduling request transmission resource is selected based on the at least one scheduling request configuration, and a scheduling request is transmitted on the selected resource.

When the scheduling request is transmitted, a scheduling request prohibit transmission timer in the scheduling request configuration in which the scheduling request transmission resource is provided is started, and the count value of the scheduling request counter is increased.

Herein, the scheduling request transmission resource may be a physical uplink control channel resource configured in the scheduling request configuration. The resource may be provided in two dimensions, i.e., a time domain and a frequency domain.

The above logical channel may be a logical channel in a logical channel group (LCG). Moreover, before abovementioned processing is executed, whether the selected logical channel is mapped to scheduling request configurations (SR configuration) of two or more carriers may be determined.

That is, when a logical channel in an LCG triggers reporting of an SR and if the logical channel is mapped to SR configurations of multiple carriers, a nearest PUCCH resource is selected for transmission of the SR. Herein, regarding selecting the nearest PUCCH resource for transmission of the SR, reference may be made to FIG. 2. The LCIH a corresponds to PUCCH resources on the carrier 1 and the carrier 2, particularly time-domain resources, which are a PUCCH 1 and a PUCCH 2 respectively. It should be illustrated that the PUCCH resources may be regarded as a series of time-domain resources having the same period in the time domain. A current time is time 1. Then, a resource nearest to the time 1 in the time domain is selected from the carrier 1 and the carrier 2 as a selected resource for transmitting the SR.

Figure 2:
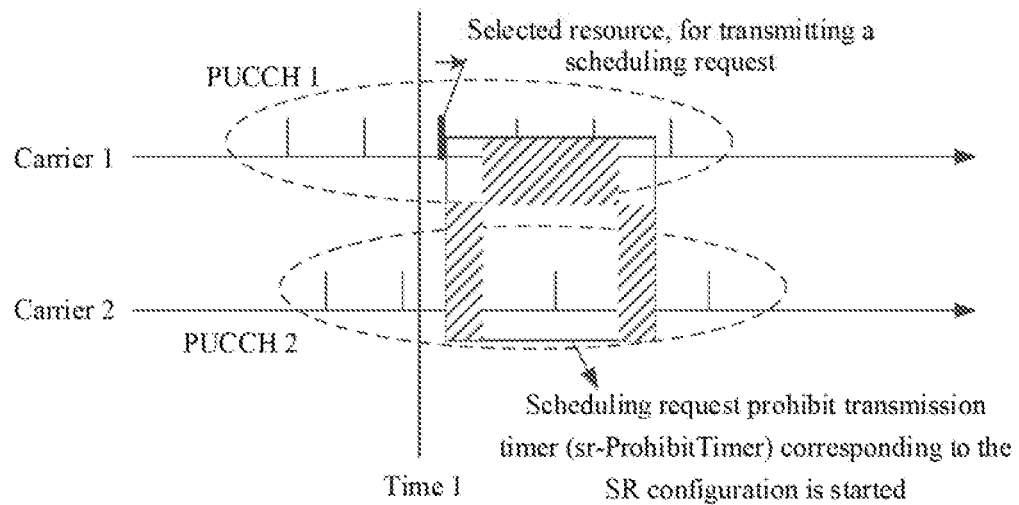
FIG. 2 is a schematic diagram showing a scenario according to an embodiment of the disclosure.

Still referring to FIG. 2, when the SR is transmitted (on the selected resource), the scheduling request prohibit transmission timer (sr-ProhibitTimer) corresponding to the SR configuration is started. The sr-ProhibiftTimer affects SR transmission of all SR configurations mapped to the logical channel. That is. SR transmission of any SR configuration mapped to the logical channel may be prohibited for a duration of the sr-ProhibitTimer. Reference may be made to a shaded portion in FIG. 2 for the valid duration of the timer. That is, SR transmission of the logical channel is not performed on every transmission resource, as shown in the shaded portion, of the carrier 1 and the carrier 2.

In addition, the scheduling request counter is configured as follows: the scheduling request counter (SR-COUNTER) is maintained for all the SR configurations mapped to the logical channel by the MAC. The count value of the SR-COUNTER is increased by one once an SR is transmitted in any SR configuration.

Furthermore, the maximum transmission number may be determined in a manner as follows. A maximum scheduling request transmission number configured in each of the at least one scheduling request configuration corresponding to the logical channel is determined; and one maximum scheduling request transmission number is selected from the configured maximum scheduling request transmission numbers as the maximum transmission number.

That is, any one of the maximum transmission numbers in the scheduling request configurations corresponding to multiple carriers is taken as the maximum transmission number corresponding to the logical channel.

In addition, a minimum value may also be selected from the configured maximum scheduling request transmission numbers, and the selected minimum value is taken as the maximum transmission number. In this case, when the count value of the SR-COUNTER is increased to meet drs-TransMax configured in any SR configuration, the terminal releases PUCCH resources of all the SR configurations mapped to the logical channel through RRC, and initiates a random access process.

In the above operation that the resource is selected based on the at least one scheduling request configuration and the scheduling request is transmitted on the selected resource, multiple determination conditions are included, which are specifically described as follows.

Whether a scheduling request transmission physical resource corresponding to the at least one scheduling request configuration is available at a current transmission moment is determined based on the at least one scheduling request configuration mapped to the logical channel.

If the scheduling request transmission physical resource is available, whether there is a scheduling request prohibit transmission timer within a valid duration in the at least one scheduling request configuration is determined.

If the scheduling request prohibit transmission timer is not within the valid duration, whether the count value of the scheduling request counter reaches the maximum transmission number is determined.

If the count value does not reach the maximum transmission number, the available scheduling request transmission physical resource is selected, and a scheduling request is transmitted on the selected available scheduling request transmission physical resource.

Description is made below with an example. If an SR is triggered, the SR is in a pending state, that is, the SR may not be transmitted immediately on the PUCCH. The MAC determines to trigger a logical channel corresponding to the SR and determines one or more SR configurations for transmission of the SR based on the configured mapping relationship. Herein, a method for triggering the logical channel corresponding to the SR is the same as that in the existing LTE, that is, the logical channel is found based on triggering of a regular BSR.

If there are multiple SR configurations for transmission of the SR, that is, the logical channel is mapped to the multiple SR configurations, it is determined that any PUCCH resource for these SR configurations is available at the current moment; and it is determined that any sr-ProhibitTimer for these SR configurations does not run.

It should be noted here that a scheduling request prohibit transmission timer (sr-ProhibitTimer) may be configured for each of at least one SR configuration corresponding to the same logical channel, however, the sr-ProhibitTimer corresponding to only one SR configuration can be within a valid duration for the logical channel. In other words, only one sr-ProhibitTimer can be started at a certain time for a logical channel.

If it is determined that SR-COUNTER<maximum transmission number drx-TransMax:

the count value of the SR-COUNTER maintained for these SR configurations is increased by one; and a physical layer is instructed to transmit the SR on the nearest PUCCH resource in available PUCCH resources.

Furthermore, the sr-ProhibitTimer is started when the SR, is transmitted.

In addition, if SR-COUNTER=drs-TransMax, the RRC is notified to release the PUCCH resources of all the SR configurations and initiate the RA process.

It can be seen that, with the above solution, the scheduling request prohibit transmission timer may be configured, resources corresponding to all the scheduling request configurations mapped to the logical channel may be prohibited from transmitting a scheduling request through the timer, and the scheduling request counter is configured to record the transmission number of transmitting the scheduling request on the resources corresponding to all the scheduling request configurations mapped to the logical channel. In this way, a transmission interval and the transmission number of the scheduling requests can be controlled in a multi-carrier scenario, thereby avoiding more processing resources from being used for transmission and other operations during the transmission of the SRs, and further ensuring system processing efficiency.

Second Embodiment

Figure 3:
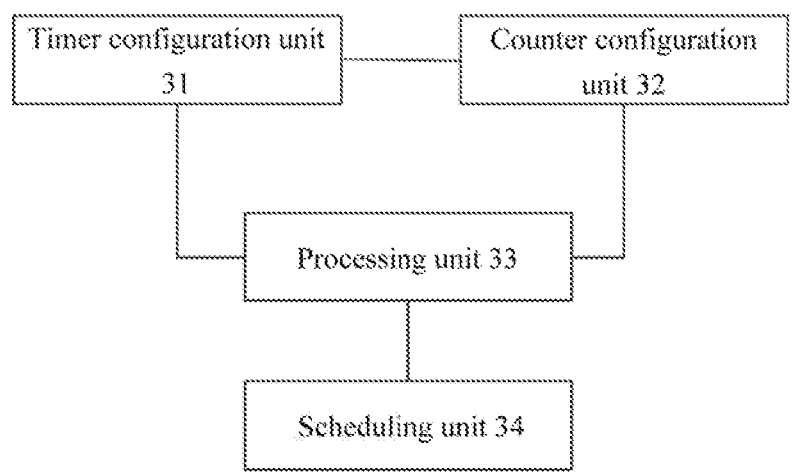
FIG. 3 is a first schematic diagram showing a composition structure of a terminal device according to an embodiment of the disclosure.

A terminal device is provided according to an embodiment of the disclosure. As shown in FIG. 3, the terminal device includes a timer configuration unit 31 and a counter configuration unit 32.

The timer configuration unit 31 is configured to configure a scheduling request prohibit transmission timer. The scheduling request prohibit transmission timer is configured to prohibit transmitting a scheduling request on all scheduling request configurations mapped to a logical channel for a valid duration.

The counter configuration unit 32 is configured to configure a scheduling request counter. The scheduling request counter is configured to, when a scheduling request is transmitted on at least one scheduling request configuration mapped to the logical channel, increase a count value.

Herein, the terminal device may be a terminal device applicable to a multi-carrier (CA) scenario.

In a case that the logical channel is mapped to multiple scheduling request configurations, a scheduling request prohibit transmission timer may be maintained in each of the scheduling request configurations. The scheduling request prohibit transmission timer to be started is determined according to a resource corresponding to the scheduling request configuration selected for transmission of a scheduling request. For example, in a case that resources corresponding to one of the scheduling request configurations are selected for transmission of a scheduling request, the scheduling request prohibit transmission timer in the scheduling request configuration is started. Furthermore, by starting the scheduling request prohibit transmission timer, all resources corresponding to all the scheduling request configurations mapped to the logical channel are prohibited from transmitting the SR.

Figure 4:
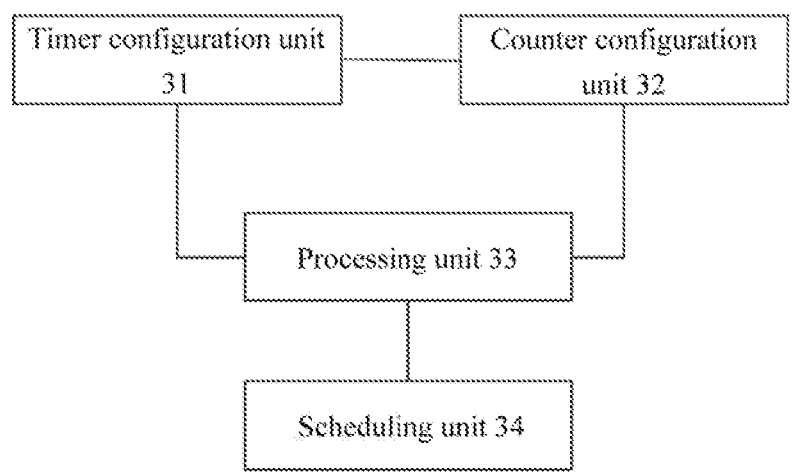
FIG. 4 is a second schematic diagram showing a composition structure of a terminal device according to an embodiment of the disclosure.

In addition, based on the structure of the terminal device in FIG. 3, the terminal device provided in the embodiment of the application may further include a processing unit 33, as shown in FIG. 4.

The processing unit 33 is configured to acquire a mapping relationship, configured by a network side, between the logical channel and the at least one scheduling request configuration. Different scheduling request configurations in the at least one scheduling request configuration corresponds to different carriers respectively. Different scheduling request configurations have the same physical uplink control channel resource period and different physical uplink control channel frequency-domain resources.

For example, if a logical channel is mapped to two scheduling request configurations (SR configuration), which are represented as SR-CONFIG-1 and SR-CONFIG-2 respectively.

Specifically, a logical channel group (LCG) is configured for a logical channel LCH a by RRC, and a mapping relationship between the logical channel LCH a and SR configurations is configured by the RRC. The LCH a is mapped to SR-CONFIG-1 and SR-CONFIG-2. SR-CONFIG-1 and SR-CONFIG-2 are SR configurations on a carrier 1 and a carrier 2 respectively.

Herein, SR-CONFIG-1 and SR-CONFIG-2 may have the same PUCCH resource period and different PUCCH frequency-domain resources.

SR-CONFIG-1 includes dsr-TransMax for identifying the maximum SR transmission number corresponding to the SR configuration. In addition, SR-CONFIG-1 corresponds to an sr-ProhibitTimer for identifying a prohibit time for retransmission of an SR after the SR corresponding to the SR configuration is transmitted (that is, when the sr-Prohibit-Timer runs, the SR is prohibited). The SR-CONFIG-2 is configured in the same manner.

As shown in FIG. 4, the terminal device further includes a scheduling unit 34.

The scheduling unit 34 is configured to, when the logical channel triggers reporting of a scheduling request and if the logical channel is mapped to at least one scheduling request configuration of at least one carrier, select a scheduling request transmission resource based on the at least one scheduling request configuration and transmit a scheduling request on the selected resource.

The processing unit 33 is configured to, when the scheduling request is transmitted, start a scheduling request prohibit transmission timer in the scheduling request configuration in which the scheduling request transmission resource are provided and increase the count value of the scheduling request counter.

Herein, the scheduling request transmission resource may be a physical uplink control channel resource configured in the scheduling request configuration. The resource may be provided in two dimensions, i.e., a time domain and a frequency domain.

The above logical channel may be a logical channel in a logical channel group (LCG). Moreover, before abovementioned processing is executed, whether the selected logical channel is mapped to scheduling request configurations (SR configuration) of two or more carriers may be determined.

That is, when a logical channel in an LCG triggers reporting of an SR and if the logical channel is mapped to SR configurations of multiple carriers, a nearest PUCCH resource is selected for transmission of the SR. Herein, regarding selecting the nearest PUCCH resource for transmission of the SR, reference may be made to FIG. 2. The LCH a corresponds to PUCCH resources on the carrier 1 and the carrier 2, particularly time-domain resources, which are a PUCCH 1 and a PUCCH 2 respectively. It should be illustrated that the PUCCH resources may be regarded as a series of time-domain resources having the same period in the time domain. A current time is time 1. Then, a PUCCH resource A nearest to the time 1 in the time domain is selected from the carrier 1 and the carrier 2, for transmission of the SR.

When the SR is transmitted, the scheduling request prohibit transmission timer (sr-ProhibitTimer) corresponding to the SR configuration is started. The sr-ProhibitTimer affects SR transmission of all SR configurations mapped to the logical channel. That is, SR transmission of any SR configuration mapped to the logical channel may be prohibited for a valid duration of the sr-ProhibitTimer.

In addition, the scheduling request counter is configured as follows: the scheduling request counter (SR-COUNTER) is maintained for all the SR configurations mapped to the logical channel by the MAC. The count value of the SR-COUNTER is increased by one once an SR is transmitted in any SR configuration.

Furthermore, the maximum transmission number may be determined in a manner as follows. The timer configuration unit determines a maximum scheduling request transmission number configured in each of the at least one scheduling request configuration corresponding to the logical channel, and select one maximum scheduling request transmission number from the configured maximum scheduling request transmission numbers as the maximum transmission number.

That is, any one of the maximum transmission numbers in the scheduling request configurations corresponding to multiple carriers is taken as the maximum transmission number corresponding to the logical channel.

In addition, a minimum value may also be selected from the configured maximum scheduling request transmission numbers, and the selected minimum value is taken as the maximum transmission number. In this case, when the count value of the SR-COUNTER is increased to meet drs-TransMax configured in any SR configuration, the terminal releases PUCCH resources of all the SR configurations mapped to the logical channel through RRC, and initiates a random access process.

In the above operation that the resource is selected based on the at least one scheduling request configuration and the scheduling request is transmitted on the selected resource, multiple determination conditions are included, which are specifically described as follows.

The scheduling unit is configured to: determine whether a scheduling request transmission physical resource corresponding to the at least one scheduling request configuration is available at a current transmission moment based on the at least one scheduling request configuration mapped to the logical channel:

determine whether there is a scheduling request prohibit transmission timer within a valid duration in the at least one scheduling request configuration, if the scheduling request transmission physical resource is available;

determine whether the count value of the scheduling request counter reaches the maximum transmission number, if the scheduling request prohibit transmission timer is not within the valid duration; and select the available scheduling request transmission physical resource and transmit a scheduling request on the selected available scheduling request transmission physical resource, if the count value does not reach the maximum transmission number.

Description is made below with an example. If an SR is triggered, the SR is in a pending state, that is, the SR may not be transmitted immediately on the PUCCH. The MAC determines to trigger a logical channel corresponding to the SR and determines one or more SR configurations for transmission of the SR based on the configured mapping relationship. Herein, a method for triggering the logical channel corresponding to the SR is the same as that in the existing LTE, that is, the logical channel is found based on triggering of a regular BSR.

If there are multiple SR configurations for transmission of the SR, that is, the logical channel is mapped to the multiple SR configurations, it is determined that any PUCCH resource for these SR configurations is available at the current moment; and it is determined that any sr-ProhibitTimer for these SR configurations does not run.

It should be noted here that a scheduling request prohibit transmission timer (sr-ProhibitTimer) may be configured for each of at least one SR configuration corresponding to the same logical channel, however, the sr-ProhibitTimer corresponding to only one SR configuration can be within a valid duration for the logical channel. In other words, only one sr-ProhibitTimer can be started at a certain time for a logical channel.

If it is determined that SR-COUNTER<maximum transmission number drx-TransMax:

the count value of the SR-COUNTER maintained for these SR configurations is increased by one; and a physical layer is instructed to transmit the SR on the nearest PUCCH resource in available PUCCH resources.

Furthermore, the sr-ProhibitTimer is started when the SR is transmitted.

In addition, if SR-COUNTER=drs-TransMax, the RRC is notified to release the PUCCH resources of all the SR configurations and initiate the RA process.

It can be seen that, with the above solution, the scheduling request prohibit transmission timer may be configured, resources corresponding to all the scheduling request configurations mapped to the logical channel may be controlled to be prohibited from transmitting a scheduling request through the timer, and the scheduling request counter is configured to record the transmission number of transmitting the scheduling request on the resources corresponding to all the scheduling request configurations mapped to the logical channel. In this way, a transmission interval and the transmission number of the scheduling requests can be controlled in a multi-carrier scenario, thereby avoiding more processing resources from being used for transmission and other operations during the transmission of the SRs, and further ensuring system processing efficiency.

Figure 5:
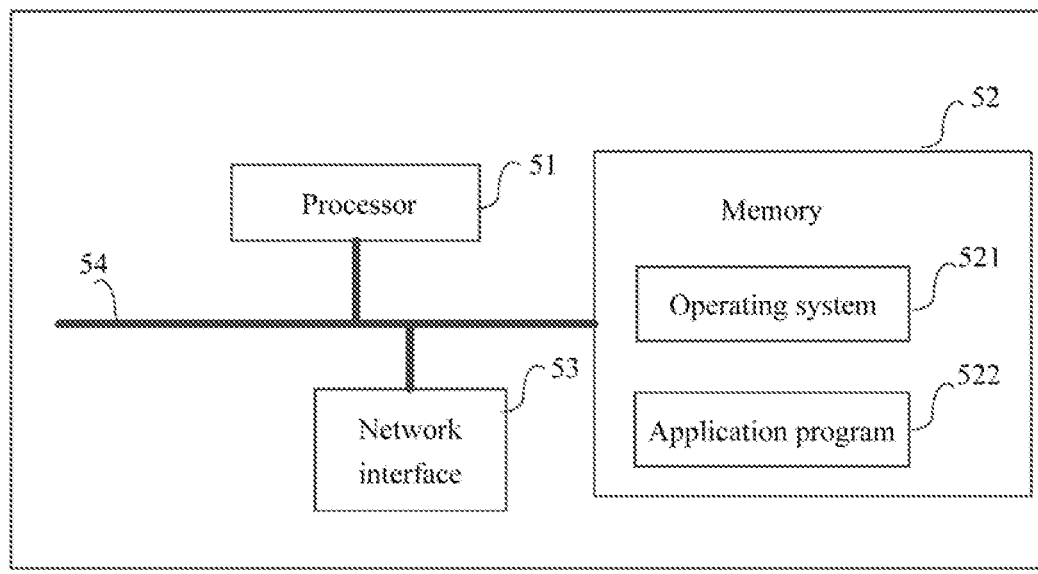
FIG. 5 is a schematic diagram showing a hardware structure according to an embodiment of the disclosure.

A hardware composition structure of a terminal device is further provided according to an embodiment of the disclosure. As shown in FIG. 5, the hardware composition structure includes at least one processor 51, a memory 52 and at least one network interface 53. All components are coupled together through a bus system 54. It can be understood that the bus system 54 is configured to implement connection communication between these components. The bus system 54 includes a power bus, a control bus and a state signal bus, in addition to a data bus. However, for clear description, various buses in FIG. 5 are represented as the bus system 54.

It can be understood that the memory 52 in the embodiment of the disclosure may be a volatile memory or a nonvolatile memory, or may include both the volatile memory and the nonvolatile memory.

In some implementation, the memory 52 stores elements as follows: executable modules, or data structures, or a subset thereof or an extended set thereof.

The extended set includes an operating system 521 and an application program 522.

Herein, the processor 51 is configured to: configure a scheduling request prohibit transmission timer, where the scheduling request prohibit transmission timer is configured to prohibit transmitting a scheduling request on all scheduling request configurations mapped to a logical channel for a valid duration; and configure a scheduling request counter, where the scheduling request counter is configured to, when a scheduling request is transmitted in at least one scheduling request configuration mapped to the logical channel, increase a count value.

Specifically, the terminal device may process the steps of the method in the above first embodiment, which is not described repeatedly herein.

A computer storage medium is provided according to an embodiment of the disclosure. A computer-executable instruction is stored in the computer storage medium. The computer-executable instruction implements the steps of the method according to the above first embodiment when being executed.

When being implemented in the form of software function module and sold or used as an independent product, the above device according to the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, network equipment or the like) to execute all or part of the method in each embodiment of the disclosure. The above storage medium includes: various media capable of storing program codes such as a U-disk, mobile storage equipment, an ROM, a magnetic disk or an optical disk. In this way, the embodiments of the disclosure are not limited to a specific combination of hardware and software.

Correspondingly, a computer storage medium is further provided according to an embodiment of the disclosure, on which a computer program is stored. The computer program is configured to execute the data scheduling method according to the embodiments of the disclosure.

Although the preferred embodiments of the disclosure have been disclosed for the exemplary purposes, those skilled in the art may realize that various improvements, additions and replacements are also possible. Therefore, the scope of the disclosure should not be limited to the above-mentioned embodiments.

The invention claimed is:

1. A method for configuring a scheduling request, executed by a terminal device and comprising:

when a logical channel triggers reporting of a scheduling request and the logical channel is mapped to at least one scheduling request configuration of at least one carrier, selecting a scheduling request transmission resource based on the at least one scheduling request configuration, and transmitting the scheduling request on the selected scheduling request transmission resource; and when the scheduling request is transmitted, starting a scheduling request prohibit transmission timer maintained in the scheduling request configuration in which the scheduling request transmission resource is provided, and increasing a count value of a scheduling request counter maintained in the scheduling request configuration;

wherein the scheduling request prohibit transmission timer is configured to prohibit transmitting a scheduling request in all scheduling request configurations mapped to a logical channel for a valid duration; and the scheduling request counter is configured to, when a scheduling request is transmitted in at least one of the scheduling request configurations mapped to the logical channel, increase a count value.

2. The method of claim 1, further comprising:
when the count value reaches a maximum transmission number, releasing the scheduling request transmission resource of the scheduling request configuration mapped to the logical channel, and initiating a random access process.

3. The method of claim 1, further comprising:
determining a maximum scheduling request transmission number configured in each of the at least one scheduling request configuration corresponding to the logical channel; and
selecting one maximum scheduling request transmission number from the configured maximum scheduling request transmission numbers as the maximum transmission number.

4. The method of claim 3, wherein the selecting one maximum scheduling request transmission number from the configured maximum scheduling request transmission numbers as the maximum transmission number comprises:
selecting a minimum value from the configured maximum scheduling request transmission numbers, and taking the selected minimum value as the maximum transmission number.

5. The method of claim 1, wherein the selecting the scheduling request transmission resource based on the at least one scheduling request configuration and the transmitting the scheduling request on the selected scheduling request transmission resource comprises:
determining whether a scheduling request transmission physical resource corresponding to the at least one scheduling request configuration is available at a current transmission moment based on the at least one scheduling request configuration mapped to the logical channel;
determining whether there is a scheduling request prohibit transmission timer within a valid duration in the at least one scheduling request configuration, if the scheduling request transmission physical resource is available;
determining whether the count value of the scheduling request counter reaches the maximum transmission number if the scheduling request prohibit transmission timer is not within the valid duration; and
selecting the available scheduling request transmission physical resource and transmitting the scheduling request on the selected available scheduling request transmission physical resource, if the count value does not reach the maximum transmission number.

6. The method of claim 1, further comprising:
acquiring a mapping relationship, configured by a network side, between the logical channel and the at least one scheduling request configuration,
wherein different scheduling request configurations in the at least one scheduling request configuration correspond to different carriers respectively, and different scheduling request configurations have a same physical uplink control channel resource period and different physical uplink control channel frequency-domain resources.

7. A terminal device, comprising:
a processor;
a memory configured to store a computer program capable of being running in the processor; and
a network interface,
wherein the processor is configured to run the computer program to execute operations of:
when a logical channel triggers reporting of a scheduling request and the logical channel is mapped to at least one scheduling request configuration of at least one carrier, selecting a scheduling request transmission resource based on the at least one scheduling request configuration, and controlling the network interface to transmit the scheduling request on the selected scheduling request transmission resource; and
when the scheduling request is transmitted, starting a scheduling request prohibit transmission timer maintained in the scheduling request configuration in which the scheduling request transmission resource is provided, and increasing a count value of a scheduling request counter maintained in the scheduling request configuration;
wherein the scheduling request prohibit transmission timer is configured to prohibit transmitting a scheduling request in all scheduling request configurations mapped to a logical channel for a valid duration; and
the scheduling request counter is configured to, when a scheduling request is transmitted in at least one of the scheduling request configurations mapped to the logical channel, increase a count value.

8. The terminal device of claim 7, wherein the processor is configured to run the computer program to execute an operation of:
when the count value reaches a maximum transmission number, releasing the scheduling request transmission resource of the scheduling request configuration mapped to the logical channel, and initiating a random access process.

9. The terminal device of claim 7, wherein the processor is configured to run the computer program to execute operations of:
determining a maximum scheduling request transmission number configured in each of the at least one scheduling request configuration corresponding to the logical channel; and
selecting one maximum scheduling request transmission number from the configured maximum scheduling request transmission numbers as the maximum transmission number.

10. The terminal device of claim 9, wherein the processor is configured to run the computer program to execute an operation of:
selecting a minimum value from the configured maximum scheduling request transmission numbers, and taking the selected minimum value as the maximum transmission number.

11. The terminal device of claim 7, wherein the processor is configured to run the computer program to execute operations of:
determining whether a scheduling request transmission physical resource corresponding to the at least one scheduling request configuration is available at a current transmission moment based on the at least one scheduling request configuration mapped to the logical channel;

determining whether there is a scheduling request prohibit transmission timer within a valid duration in the at least one scheduling request configuration, if the scheduling request transmission physical resource is available;

determining whether the count value of the scheduling request counter reaches the maximum transmission number if the scheduling request prohibit transmission timer is not within the valid duration; and selecting the available scheduling request transmission physical resource and controlling the network interface to transmit the scheduling request on the selected available scheduling request transmission physical resource, if the count value does not reach the maximum transmission number.

12. The terminal device of claim 7, wherein the processor is configured to run the computer program to execute an operation of:

acquiring a mapping relationship, configured by a network side, between the logical channel and the at least one scheduling request configuration, wherein different scheduling request configurations in the at least one scheduling request configuration correspond to different carriers respectively, and different scheduling request configurations have a same physical uplink control channel resource period and different physical uplink control channel frequency-domain resources.

13. A computer storage medium on which a computer-executable instruction is stored, wherein the computer-executable instruction implements a method for configuring a scheduling request when being executed, wherein the method comprises:

when a logical channel triggers reporting of a scheduling request and the logical channel is mapped to at least one scheduling request configuration of at least one carrier, selecting a scheduling request transmission resource based on the at least one scheduling request configuration, and transmitting the scheduling request on the selected scheduling request transmission resource; and when the scheduling request is transmitted, starting a scheduling request prohibit transmission timer maintained in the scheduling request configuration in which the scheduling request transmission resource is provided, and increasing a count value of a scheduling request counter maintained in the scheduling request configuration;

wherein the scheduling request prohibit transmission timer is configured to prohibit transmitting a scheduling request in all scheduling request configurations mapped to a logical channel for a valid duration; and the scheduling request counter is configured to, when a scheduling request is transmitted in at least one of the scheduling request configurations mapped to the logical channel, increase a count value.

14. The computer storage medium of claim 13, wherein the method further comprises:

when the count value reaches a maximum transmission number, releasing the scheduling request transmission resource of the scheduling request configuration mapped to the logical channel, and initiating a random access process.

15. The computer storage medium of claim 13, wherein the method further comprises:

determining a maximum scheduling request transmission number configured in each of the at least one scheduling request configuration corresponding to the logical channel; and selecting one maximum scheduling request transmission number from the configured maximum scheduling request transmission numbers as the maximum transmission number.

16. The computer storage medium of claim 15, wherein the selecting one maximum scheduling request transmission number from the configured maximum scheduling request transmission numbers as the maximum transmission number comprises:

selecting a minimum value from the configured maximum scheduling request transmission numbers, and taking the selected minimum value as the maximum transmission number.

17. The computer storage medium of claim 13, wherein the selecting the scheduling request transmission resource based on the at least one scheduling request configuration and the transmitting the scheduling request on the selected scheduling request transmission resource comprises:

determining whether a scheduling request transmission physical resource corresponding to the at least one scheduling request configuration is available at a current transmission moment based on the at least one scheduling request configuration mapped to the logical channel;

determining whether there is a scheduling request prohibit transmission timer within a valid duration in the at least one scheduling request configuration, if the scheduling request transmission physical resource is available;

determining whether the count value of the scheduling request counter reaches the maximum transmission number if the scheduling request prohibit transmission timer is not within the valid duration; and selecting the available scheduling request transmission physical resource and transmitting the scheduling request on the selected available scheduling request transmission physical resource, if the count value does not reach the maximum transmission number.

* * * * *